United States Patent
McCaffrey

(10) Patent No.: US 8,029,234 B2
(45) Date of Patent: Oct. 4, 2011

(54) SYSTEMS AND METHODS INVOLVING AERODYNAMIC STRUTS

(75) Inventor: Michael G. McCaffrey, Windsor, CT (US)

(73) Assignee: United Technologies Corp., East Hartford, CT (US)

( * ) Notice: Subject to any disclaimer, the term of this patent is extended or adjusted under 35 U.S.C. 154(b) by 1105 days.

(21) Appl. No.: 11/782,110

(22) Filed: Jul. 24, 2007

(65) Prior Publication Data

US 2009/0028698 A1 Jan. 29, 2009

(51) Int. Cl.
*F01D 25/16* (2006.01)

(52) U.S. Cl. ......................................... 415/142

(58) Field of Classification Search ............... 415/142
See application file for complete search history.

(56) References Cited

U.S. PATENT DOCUMENTS

| | | |
|---|---|---|
| 2,674,845 A * | 4/1954 | Pouchot ..................... 415/211.2 |
| 3,979,065 A | 9/1976 | Madden |
| 4,203,286 A | 5/1980 | Warburton |
| 5,207,556 A | 5/1993 | Frederick et al. |
| 5,217,348 A | 6/1993 | Rup, Jr. et al. |
| 5,645,397 A | 7/1997 | Soechting et al. |
| 6,021,637 A | 2/2000 | Scavo |
| 6,027,305 A * | 2/2000 | Ng et al. ..................... 415/115 |
| 6,112,513 A | 9/2000 | Catt et al. |
| 6,139,259 A * | 10/2000 | Ho et al. ..................... 415/208.1 |
| 6,565,313 B2 | 5/2003 | Nikkanen et al. |
| 6,695,578 B2 | 2/2004 | Winslow et al. |
| 7,100,875 B2 | 9/2006 | Shmilovich et al. |
| 2008/0056901 A1 * | 3/2008 | Mah et al. ................. 416/223 R |

* cited by examiner

*Primary Examiner* — Richard Edgar

(74) *Attorney, Agent, or Firm* — Carlson, Gaskey & Olds, P.C.

(57) ABSTRACT

Systems and methods involving struts are provided. In this regard, a representative system includes a gas turbine engine defining a gas flow path. The gas turbine engine comprises a strut extending into the gas flow path. The strut has an interior operative to receive pressurized air, an outer surface, and ports communicating between the outer surface and the interior of the strut, the ports are operative to receive the pressurized air from the interior and emit the pressurized air into the gas flow path such that an effective aerodynamic length of the strut along the gas flow path is increased.

9 Claims, 3 Drawing Sheets

SYSTEMS AND METHODS INVOLVING AERODYNAMIC STRUTS

BACKGROUND

1. Technical Field

The invention relates to gas turbine engines.

2. Description of the Related Art

Gas turbine engines incorporate rotating components. For example, rotating disks that mount blades are used to compress air for combustion or expand gas for extraction of power. In this regard, struts may be used to mount bearings that support such rotating components.

In some applications, bearings often require oil for lubrication and cooling. Thus, the required shape of a strut may be driven by the desire to pass oil through an inner cavity of the strut to the bearing that the strut supports. Typically, the required shape is not an aerodynamically desirable shape.

SUMMARY

Systems and methods involving struts are provided. In this regard, an exemplary embodiment of such a system comprises a gas turbine engine defining a gas flow path. The gas turbine engine comprises a strut extending into the gas flow path. The strut has an interior cavity operative to receive pressurized air, an outer surface, and ports communicating between the outer surface and the interior of the strut, the ports are operative to receive the pressurized air from the interior and emit the pressurized air into the gas flow path such that an aerodynamic length of the strut along the gas flow path is increased.

An exemplary embodiment of a strut for supporting a rotating body has an outer surface, an interior defining a first cavity this is operative to receive pressurized oil, and a second cavity that is operative to receive pressurized air. The strut also has ports communicating between the outer surface and the second cavity, the ports are operative to receive the pressurized air from the cavity and emit the pressurized air through the outer surface.

An exemplary embodiment of a strut assembly comprises a bearing, oil, and a strut. The strut has an outer surface, an interior defining a first cavity that is operative to receive pressurized oil and a second cavity that is operative to receive pressurized air, and ports communicating between the outer surface and the second cavity. The ports are operative to receive the pressurized air from the cavity and emit the pressurized air through the outer surface.

An embodiment of a method of effectively increasing the aerodynamic length of a strut disposed in a fluid stream comprises the steps of: providing a strut with an interior cavity fluidly coupled to an outer strut surface by one or more ports; introducing a second fluid into the interior cavity at a pressure that is greater than the fluid stream pressure; and expelling the second fluid through the outer surface and into the fluid stream via the one or more ports such that the aerodynamic length of the strut is effectively increased with respect to the fluid stream.

Other systems, features, and/or advantages will be or may become apparent to one with skill in the art upon examination of the following drawings and detailed description. It is intended that all such additional systems, features, and/or advantages be included within this description and protected by the accompanying claims.

DETAILED DESCRIPTION

Systems involving aerodynamic struts are provided. In this regard, several exemplary embodiments will be described. Notably, some design constraints may require a component located along a gas flow path to be rather wide and, therefore, aerodynamically undesirable. For instance, a strut may be required to carry lubrication oil to bearings, hydraulic fluids or instrumentation cables. Often, this design constraint results in a strut having an aspect ratio (length to width) of less than 2:1. Such an aspect ratio can cause gas traveling along the gas flow path to separate from the strut thereby causing significant aerodynamic loss. Therefore, it may be desirable to effectively lengthen the aerodynamic length of the strut along the gas flow path such that the strut has an aspect ratio of 2:1 or greater, such as 4:1 or greater, for example.

Figure 1:
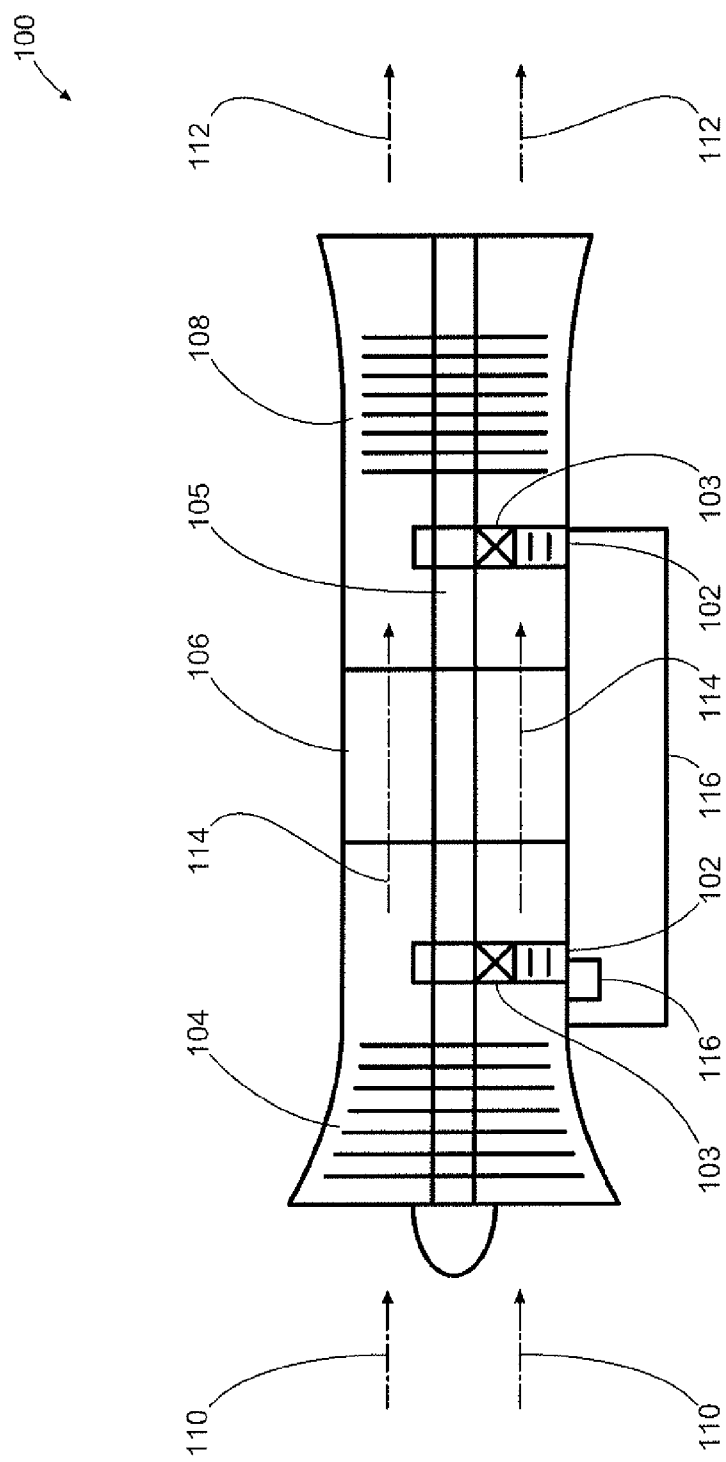
FIG. 1 is a side view illustrating exemplary embodiment of a gas turbine engine and aerodynamic struts.

Referring now in detail to the drawings, FIG. 1 is a simplified schematic side view illustrating an exemplary embodiment of a gas turbine engine 100 that incorporates struts 102. In this embodiment, the struts support bearings 103. As shown in FIG. 1, engine 100 includes a compression section 104 that is linked to a turbine section 108 by a central shaft 105. The shaft 105 is supported by bearings 103 that are held by struts 102. Bleed air paths 116 route pressurized air to struts 102 from the compression section 104.

In operation, gas 110 enters the compression section 104 and is compressed. The compressed gas then travels along gas flow path 114 and is mixed with fuel and combusted in the combustion section 106. The gas then enters the turbine section 108 and exits the engine as a propulsive exhaust gas 112.

Pressurized air, such as bleed air, may be bled from the gas flow path forward of the combustion section 106 and routed to provide pressurized air to the struts 102 via bleed air paths 116. The pressurized air is used to effectively lengthen the struts 102 aerodynamically along the gas flow path, thereby increasing the aerodynamic efficiency of the struts 102.

Figure 2:
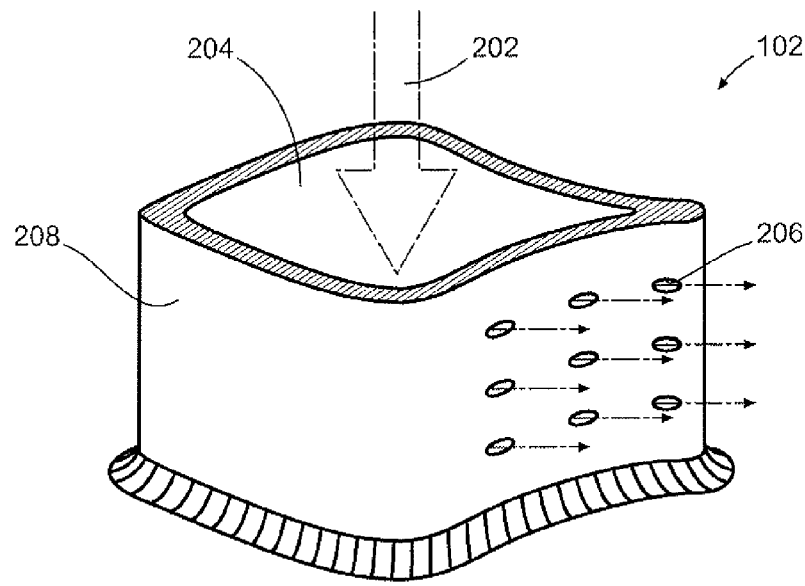
FIG. 2 is a perspective view of an exemplary embodiment of an aerodynamic strut.

FIG. 2 is a perspective cutaway view of a strut 102 that may support components of a turbine engine such as bearings (not shown). Strut 102 comprises an outer surface 208 and an interior cavity 204. Ports 206 are located on the outer surface 208. The ports are in communication with the interior 204 and the outer surface 208 of the strut 102.

A pressurized air source provides pressurized air 202 that flows through the interior 204 of the strut 102. The pressurized air 202 may then be emitted into and expelled from ports 206. This is done to effectively lengthen the strut 102 aerodynamically along the gas flow path (not shown). Specifically, the pressurized air 102 urges gas travelling along the gas flow path to form a recirculation bubble that, in turn, causes the main flow to follow the shape created by the front of the strut and the extended shape created by the recirculation bubble.

The shape of the strut 102 illustrated in FIG. 2 is merely an illustration of but one possible embodiment. The shape of the strut 102 may vary depending on a variety of factors including, but not limited to, the component that the strut 102 is supporting, the location of the strut 102 in the gas turbine engine, the gas flow path around the strut 102 at particular gas flow velocities, desired design characteristics of the gas turbine engine, and materials used in the fabrication of the gas turbine engine.

Figure 3:
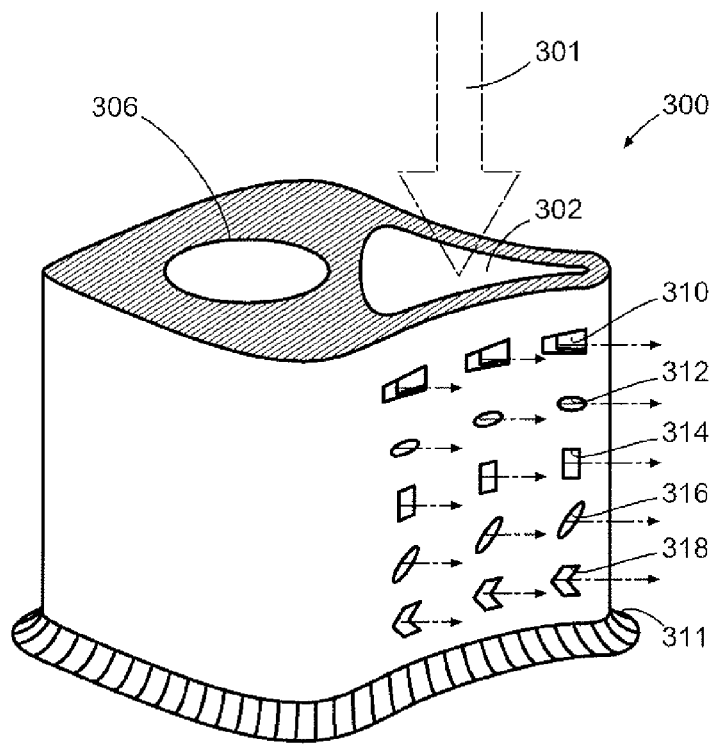
FIG. 3 is a perspective view of another exemplary embodiment of an aerodynamic strut.

FIG. 3 depicts another embodiment of a strut. As shown in FIG. 3, strut 300 has a first interior cavity 302 and a second interior cavity 306. The second interior cavity 306 is in communication with ports, such as ports 310, 312, 314, 316, and 318. The representative ports illustrated in FIG. 3 are shown in a variety of shapes such as wedge-shaped ports 310, round ports 312, slot-shaped ports 314, and chevron shaped ports 318. Additionally, the ports may be skewed ports 316 that are skewed on an axis that is not parallel to the gas flow path. The shapes, locations and orientations of the ports shown are illustrative of possible embodiments. However, the ports are not limited to those shapes, locations, and orientations shown.

The location of one or more of the ports 310, 312, 314, 316, and 318 could be dependent upon the aerodynamic nature of the strut 300. For example, the shape of the strut 300, and the effects on the gas flow path at a variety of gas flow velocities may influence the locations, shapes, and orientations of the ports. Thus, the location of the ports could be anywhere on the outer surface 308 of the strut 300 to effect the gas flow path around the strut 300 and increase the aerodynamic efficiency of the strut along the gas flow path.

A fillet may be located between the strut and the surface to which the strut is attached. Fillet 311 may also have an effect on the gas flow path around the strut 300. Therefore, one or more of the ports may be orientated or positioned to adjust for aerodynamic inefficiencies caused by filet 311 as well.

Cavity 306 may carry oil, or may be used as a conduit for oil carrying tubes (not shown). In some embodiments, these tubes may be insulated. Additionally, or alternatively, interior cavity 306 may be insulated.

The size of cavity 306 may affect the design characteristics of strut 300 by causing the strut to have an aerodynamically undesirable width. Pressurized air 301 may enter space 302 and be emitted into the gas flow path of the engine, thereby increasing the effective aerodynamic length of the strut 300 along the gas flow path.

Figure 4:
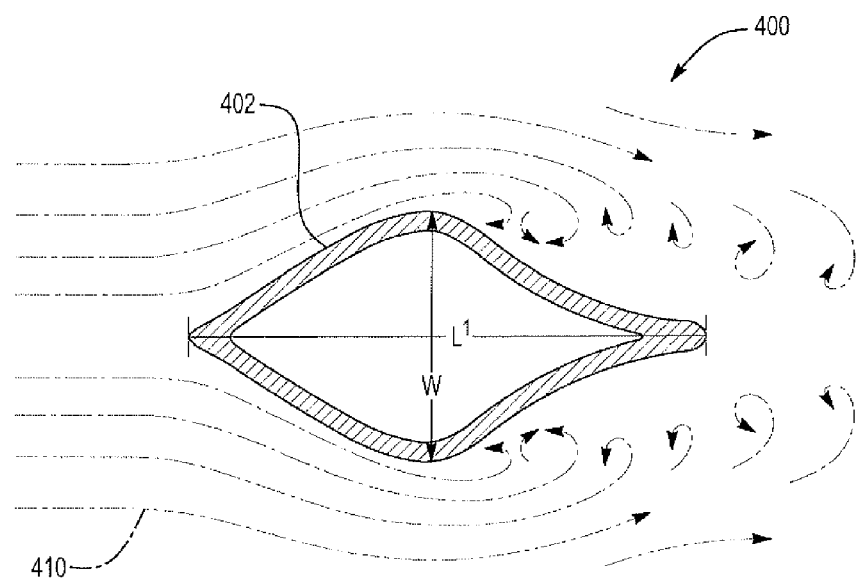
FIG. 4 is a top view of an exemplary embodiment of an aerodynamic strut in the gas flow path.

FIG. 4 is a schematic top view of a strut 400 without ports for emitting pressurized air. In this embodiment, the gas flow path 410 flows around the outer surface 402 of the strut 400. Note that the main flow separates from the outer surface in a vicinity of the location of maximum thickness of the strut. In this view the strut 400 has a width W and an aerodynamic length of L1 and an aspect ratio of about 2:1.

Figure 5:
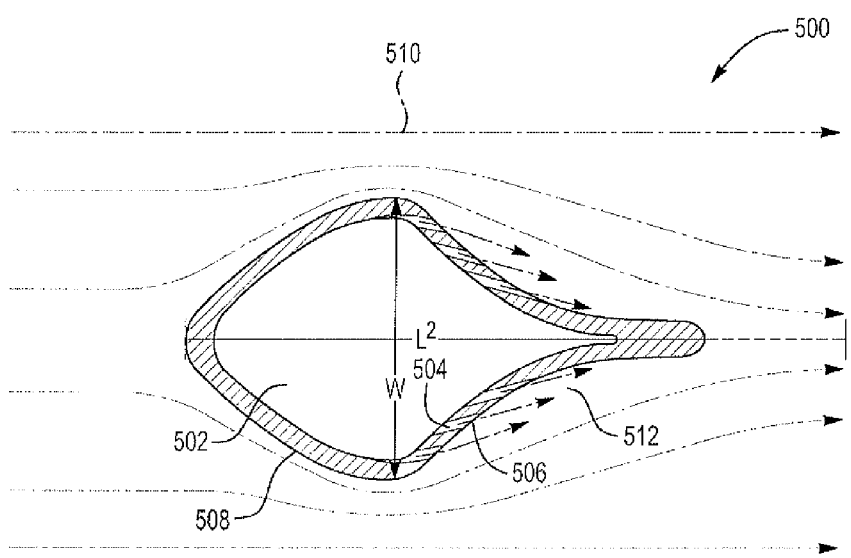
FIG. 5 is a top view of an exemplary embodiment of an aerodynamic strut illustrating the impact of the fluid being expelled by the ports.

FIG. 5 is a top view of a strut 500 having ports for emitting pressurized air. This embodiment includes an interior 502 and ports 504. Pressurized air is emitted from ports 504 and creates a recirculation bubble at location 506 along the outer surface 508 of the strut 500. The recirculation bubble influences the gas flow path depicted by the arrows 510.

In the embodiment of FIG. 5, the downstream portion 512 of the strut 500 has a tapered shape formed by opposing concave surfaces. This shape can have the effect of trapping the recirculation bubbles along the outer surface 508 of the strut 500, thereby urging gas travelling along the gas flow path 510 away from the outer surface 508 of the strut 500. This effectively aerodynamically lengthens the strut 500 in a direction along the gas flow path 410. This effectively causes the strut 500 to have less of an adverse impact on the gas flow path. The downstream portions 512 of the strut 500 are not limited to concave shapes, but may be one of a variety of shapes. The ports 506 placed downstream of the width W create the recirculation bubble 506 downstream of the width W to urge the gas flow path 510 away from the outer surface 508 as noted hereinabove. As a result the length L2 is effectively multiplied to create an aspect ratio beyond 2:1 to 4:1 and greater.

In this regard, effectively increasing the aerodynamic length of a strut disposed in a fluid stream can incorporate the following. First, a strut with an interior cavity fluidly coupled to an outer strut surface by one or more ports is provided. Second, a fluid (which may be the same or different from the fluid that forms the fluid stream prior to reaching the strut) is provided into the interior cavity at a pressure that is greater than the fluid stream pressure. Thereafter, the fluid is expelled through the outer surface and into the fluid stream via the one or more ports such that the aerodynamic length of the strut is effectively increased with respect to the fluid stream.

It should be emphasized that the above-described embodiments are merely possible examples of implementations. Many variations and modifications may be made to the above-described embodiments. By way of example, although the ports are generally directed downstream with respect to the gas flow path, ports can be oriented in a generally upstream direction or perpendicular to the gas flow path in other embodiments. All such modifications and variations are intended to be included herein within the scope of this disclosure and protected by the accompanying claims.

What is claimed is:

1. A gas turbine engine defining a gas flow path, the gas turbine engine comprising:
   a strut extending into the gas flow path, the strut having:
      an interior cavity operative to receive pressurized air;
      an outer surface;
      a trailing edge;
      a widest width; and
      ports disposed downstream of said widest width and upstream of said trailing edge communicating between the interior cavity of the strut and the outer surface, the ports being operative to receive the pressurized air from the interior and emit the pressurized air into the gas flow path such that an effective aerodynamic length of the strut along the gas flow path is increased beyond a length of said strut and wherein the strut has a downstream portion downstream of said widest width exhibiting a convex shape, wherein at least one of the ports is located on the convex shape.

2. A strut assembly comprising:
   a bearing; and
   a strut supporting the bearing and having:
      an outer surface;
      a trailing edge;
      a widest width;
      an interior defining a first cavity operative to receive pressurized oil and a second cavity operative to receive pressurized air;
      ports disposed downstream of said widest width communicating between the outer surface and the second cavity, the ports being operative to receive the pressurized air from the cavity and emit the pressurized air through the outer surface and
      two side portions having:
         an upstream portion; and
         a downstream portion disposed downstream of said widest width
            exhibiting a convex shape on each side portion, wherein
            at least one the of ports is located on the convex shape.

3. A strut assembly comprising:
   a bearing; and a strut supporting the bearing and having:
an outer surface;
an interior defining a first cavity operative to receive pressurized oil and a second cavity operative to receive pressurized air; and
ports disposed downstream of said widest width communicating between the outer surface and the second cavity, the ports being operative to receive the pressurized air from the cavity and emit the pressurized air through the outer surface and wherein the strut further comprises two side portions having:
an upstream portion; and
a downstream portion disposed downstream of said widest width
exhibiting a convex shape on each side portion, wherein
at least one the of ports is located on the convex shape.

4. A gas turbine engine defining a gas flow path, the gas turbine engine comprising:
a strut extending into the gas flow path, the strut having:
an interior cavity operative to receive pressurized air;
an outer surface;
a trailing edge;
a widest width; and
ports disposed downstream of said widest width and upstream of said trailing edge communicating between the interior cavity of the strut and the outer surface, the ports being operative to receive the pressurized air from the interior and emit the pressurized air into the gas flow path such that an effective aerodynamic length of the strut along the gas flow path is increased beyond a length of said strut wherein the strut further comprises a second interior cavity operative to receive an oil tube.

5. A gas turbine engine defining a gas flow path, the gas turbine engine comprising:
a strut extending into the gas flow path, the strut having:
an interior cavity operative to receive pressurized air;
an outer surface;
a trailing edge;
a widest width;
ports disposed downstream of said widest width and upstream of said trailing edge communicating between the interior cavity of the strut and the outer surface, the ports being operative to receive the pressurized air from the interior and emit the pressurized air into the gas flow path such that an effective aerodynamic length of the strut along the gas flow path is increased beyond a length of said strut and;
a bearing supported by the strut; and
an oil tube operative to provide oil to the bearing.

6. A gas turbine engine defining a gas flow path, the gas turbine engine comprising:
a strut extending into the gas flow path, the strut having:
an interior cavity operative to receive pressurized air;
an outer surface;
a trailing edge;
a widest width; and
ports disposed downstream of said widest width and upstream of said trailing edge communicating between the interior cavity of the strut and the outer surface, the ports being operative to receive the pressurized air from the interior and emit the pressurized air into the gas flow path such that an effective aerodynamic length of the strut along the gas flow path is increased beyond a length of said strut wherein at least one of the ports is wedge shaped.

7. A gas turbine engine defining a gas flow path, the gas turbine engine comprising:
a strut extending into the gas flow path, the strut having:
an interior cavity operative to receive pressurized air;
an outer surface;
a trailing edge;
a widest width; and
ports disposed downstream of said widest width and upstream of said trailing edge communicating between the interior cavity of the strut and the outer surface, the ports being operative to receive the pressurized air from the interior and emit the pressurized air into the gas flow path such that an effective aerodynamic length of the strut along the gas flow path is increased beyond a length of said strut wherein the effective aerodynamic length of the strut is longer than the actual length of the strut along the gas flow path provides the strut with an aspect ratio of at least 4:1.

8. A strut for supporting a rotating body, the strut comprising:
an outer surface;
a trailing edge;
a widest width;
an interior defining a first cavity operative to receive pressurized oil and a second cavity operative to receive pressurized air; and
a port disposed only downstream of said widest width and upstream of said trailing edge, said port communicating between the second cavity and the outer surface, the port being operative to receive the pressurized air from the cavity and emit the pressurized air through the outer surface wherein the strut has two opposing sides, each of the sides having an upstream portion and a downstream portion disposed downstream of said widest width, each said downstream portion exhibiting a convex shape, wherein the port is located on the convex shape of the downstream portion of one of the sides.

9. A strut for supporting a rotating body, the strut comprising:
an outer surface;
a trailing edge;
a widest width;
an interior defining a first cavity operative to receive pressurized oil and a second cavity operative to receive pressurized air; and
a port disposed only downstream of said widest width and upstream of said trailing edge, said port communicating between the second cavity and the outer surface, the port being operative to receive the pressurized air from the cavity and emit the pressurized air through the outer surface and
the strut further comprises a second port disposed downstream of said widest width communicating between the second cavity and the outer surface, the second port being operative to receive the pressurized air from the cavity and emit the pressurized air through the outer surface; and
the second port is located on the convex shape of the downstream portion of the opposing one of the sides.

* * * * *